US009643547B2

United States Patent
Hallet

(10) Patent No.: US 9,643,547 B2
(45) Date of Patent: May 9, 2017

(54) SWITCHING DEVICE FOR THE TOP-END OF AN AUTOMOBILE VEHICLE STEERING COLUMN

(75) Inventor: Michel Hallet, Clinchampssur-Orne (FR)

(73) Assignee: SC2N, Creteil (FR)

( * ) Notice: Subject to any disclaimer, the term of this patent is extended or adjusted under 35 U.S.C. 154(b) by 863 days.

(21) Appl. No.: 13/635,115

(22) PCT Filed: Mar. 11, 2011

(86) PCT No.: PCT/FR2011/000130
§ 371 (c)(1),
(2), (4) Date: Mar. 22, 2013

(87) PCT Pub. No.: WO2011/114015
PCT Pub. Date: Sep. 22, 2011

(65) Prior Publication Data
US 2013/0169040 A1    Jul. 4, 2013

(30) Foreign Application Priority Data
Mar. 16, 2010  (FR) ...................................... 10 01052

(51) Int. Cl.
*B60R 16/027*   (2006.01)
*B60R 16/03*    (2006.01)
*B60R 16/02*    (2006.01)

(52) U.S. Cl.
CPC .............. *B60R 16/03* (2013.01); *B60R 16/02* (2013.01); *B60R 16/027* (2013.01)

(58) Field of Classification Search
CPC ........ B60R 16/03; B60R 16/02; B60R 16/027
See application file for complete search history.

(56) References Cited

U.S. PATENT DOCUMENTS 3,832,597 A * 8/1974 Mitchell .......................... 315/82
3,910,679 A * 10/1975 Rushworth et al. .......... 359/264
(Continued)

FOREIGN PATENT DOCUMENTS

EP        0 147 110 A2     7/1985
WO        2010/000859 A1   1/2010
WO        WO 2010000859 A1 * 1/2010 ............... B60Q 1/14

OTHER PUBLICATIONS

International Search Report w/translation mailed on Jul. 27, 2011 (4 pages).
(Continued)

*Primary Examiner* — Thienvu Tran
*Assistant Examiner* — Pinping Sun
(74) *Attorney, Agent, or Firm* — Osha Liang LLP

(57) ABSTRACT

The invention relates to a switching device for motor vehicle column top comprising a microcontroller (1). The latter comprises at least two distinct functional switching blocks (3, 5), each block being linked to two signal inputs (e1, e2, e3, e4) and two signal outputs (a, b, c) of the microcontroller (1), a signal output (a, b, c) or a signal input (e1, e2, e3, e4) of which is linked solely to a single functional block (3, 5) and comprising four switches (7, 9, 11, 13, 15, 17, 19, 21), each switch (7, 9, 11, 13, 15, 17, 19, 21) being linked to a signal input/output pair of the microcontroller (1) distinct from that of the other three of the same block (3, 5). At least two distinct functional switching blocks (3, 5) share only either one signal output (a, b, c), or input (e1, e2, e3, e4) of the microcontroller (1), and the microcontroller (1) is configured so as to deduce front a signal dispatched by at least one signal output (a, b, c) that has passed through at least one functional switching block (3, 5) and has been received at at least one signal input (e1, e2, e3, e4), the state of switching (Continued)

of at least one switch (7, 9, 11, 13, 15, 17, 19, 21) of a functional switching block (3, 5).

10 Claims, 5 Drawing Sheets

(56) References Cited

U.S. PATENT DOCUMENTS

| | | | | |
|---|---|---|---|---|
| 5,051,883 | A * | 9/1991 | Cheng | 363/89 |
| 5,397,923 | A * | 3/1995 | Christensen | 307/9.1 |
| 6,396,431 | B1 * | 5/2002 | Swanick et al. | 341/177 |
| 6,683,893 | B2 * | 1/2004 | Wang | 372/10 |
| 7,019,463 | B2 * | 3/2006 | Kesterson | B60Q 1/20 |
| | | | | 307/10.8 |
| 7,504,600 | B2 * | 3/2009 | Hallet | B60Q 1/1461 |
| | | | | 200/61.54 |
| 7,755,294 | B2 * | 7/2010 | Shelton et al. | 315/80 |
| 8,003,902 | B1 * | 8/2011 | Cannella | 200/61.54 |
| 2002/0167494 | A1 * | 11/2002 | Sherman et al. | 345/168 |
| 2008/0143508 | A1 * | 6/2008 | Saitoh | B60R 22/48 |
| | | | | 340/457.1 |
| 2008/0246404 | A1 * | 10/2008 | Shelton | B60Q 1/1423 |
| | | | | 315/82 |

OTHER PUBLICATIONS

Espacenet Abstract of EP0147110 (A2) dated Jul. 3, 1985 (1 page).

* cited by examiner

|    | e1  | e2  | e3  | e4  |
|----|-----|-----|-----|-----|
| 15 | 0   | a+b | a+b | 0   |
| 17 | 0   | c   | a+b | 0   |
| 19 | c   | 0   | a+b | 0   |
| 21 | a+b | 0   | a+b | 0   |

*Fig. 4*

SWITCHING DEVICE FOR THE TOP-END OF AN AUTOMOBILE VEHICLE STEERING COLUMN

The invention relates to a switching device for the top-end of an automobile vehicle steering column and the associated control assembly for the top-end of an automobile vehicle steering column.

A control assembly for the top-end of a steering column generally comprises a plurality of switches accessible to a user of the vehicle. The user thus actuates functions, such as turning on the headlights or the fog lights, by changing the position of one of the switches.

A known solution is to use a microcontroller configured for periodically activating the reading of the switching states of the modules. Another known solution is to use a configuration where several signal outputs of a microcontroller are connected to a single signal input, and where several signal inputs of said microcontroller are connected to the same output. Each switch is then identified by a signal input/output pair of the microcontroller specific to it.

This configuration, referred to as digital matrix, allows the number of switches whose state becomes accessible to the microcontroller to be increased without increasing the number of signal inputs and outputs of said microcontroller, and hence the price of this component. Indeed, for a given number of signal inputs and of signal outputs of the microcontroller, the number of coding possibilities is very high.

The document EP 0 147 110 discloses the use of such a configuration for a multifunction steering wheel comprising a microcontroller, as can be seen notably in FIG. 6 of this document.

Said digital matrix configuration comprises however the risk that if a switch is blocked in the closed position, the signal emanating from a signal output can be brought to an input other than those corresponding to the disposition of the switches. Consequently, there can be an erroneous interpretation of said disposition of the switches, and hence an inappropriate response of the equipment of the vehicle.

For example, considering FIG. 6 of EP 0 147 110, if the switch "windshield wipers off" connected to the input 7 and to the signal output 21 is in the closed position subsequent to a bad contact, and the user simultaneously closes the switches "cruise control resume", connected to the input 7 and to the signal output 22, and "lights off", connected to the input 9 and to the signal output 21, the signal emanating from the signal output 22 is conducted via the switch "windshield wipers off" then the switch "lights off" to the input 9.

Since the signal input/output pair 9, 22 corresponds to the switch "cruise control on/off", the system will interpret the signal received as a closing of said switch "cruise control on/off" without the latter having been actuated.

In order to overcome this defect, which leads to a safety risk, a known solution is to implement in the switching circuit additional electronic elements. As can be seen in FIG. 3, the document WO 2010/00859 discloses the use of such a configuration with diodes, indexed 23. These diodes prevent the return of the signal over another line after having passed a switch. However, these components contribute to increasing the cost of the device.

The aim of the invention is to keep the advantage of the large number of switches whose state is accessible to the microcontroller for a given number of signal inputs/outputs offered by the digital matrix configuration, while at the same time improving the safety aspect without however implementing costly electronic components.

For this purpose, one subject of the invention is a switching device for the top-end of an automobile vehicle column comprising a microcontroller, characterized in that it comprises at least two separate switching functional blocks, each block being connected to two signal inputs and two signal outputs of the microcontroller, one signal output or one signal input of which is only connected to a single functional block, and comprising four switches, each switch being connected to a signal input/output pair of the microcontroller separate from that of the other three of the same block, in that at least two separate switching functional blocks only share either one signal output or one signal input of the microcontroller, and in that the microcontroller is configured for deducing from a signal sent by at least one signal output having transited via at least one switching functional block and received at at least one signal input, the switching state of at least one switch of a switching functional block.

In this way, the large number of switches whose state is accessible to the microcontroller is conserved, while at the same time reducing the number of tracks and the risk of an erroneous interpretation of the switching state of the device without having to implement any additional electronic components.

Furthermore, the device can exhibit one or more features from amongst the following ones.

The microcontroller is configured for detecting the signal sent by a signal output only connected to one switching functional block at a signal input which is not connected to said switching functional block, and for sending a message comprising an identifier of the block to which the signal output is connected.

Each switching functional block is associated with a switching module that can take a switching state according to the control position applied by a user.

The switches associated with a switching module comprise contacting elements and the control position applied by the user defines a combination of contacts allowing digital information corresponding to a switching state to be defined at a signal input of the microcontroller.

A switching functional block controls the switching of the lights of the vehicle between the off, side lights, low-beam and high-beam positions, and another controls the fog lights and also a horn of the vehicle.

The microcontroller is configured for determining the switching state of the separate functional blocks by sequentially sending trains of periodic signals over each of its signal outputs.

The signals emitted over each of the two signal outputs of the microcontroller connected to the same block are out of phase and emitted simultaneously.

The pulses of a train last a few nano- or microseconds, and the period of the trains is a few milliseconds.

The current to which the signals correspond is a few milliamps.

Another subject of the invention is a control assembly for the top-end of an automobile vehicle steering column comprising a switching device such as defined hereinabove.

Other features and advantages of the invention will become more clearly apparent upon reading the following description, presented by way of non-limiting illustrative example, and from the appended drawings amongst which:

FIG. 4 shows the signal arriving at the signal inputs of the microcontroller in the configuration in FIG. 3 depending on the closing of one of the switches of the intact functional block.

In all the figures, the same elements carry the same reference numbers.

The invention relates to a switching device for the top-end of an automobile vehicle steering column.

Figure 1:
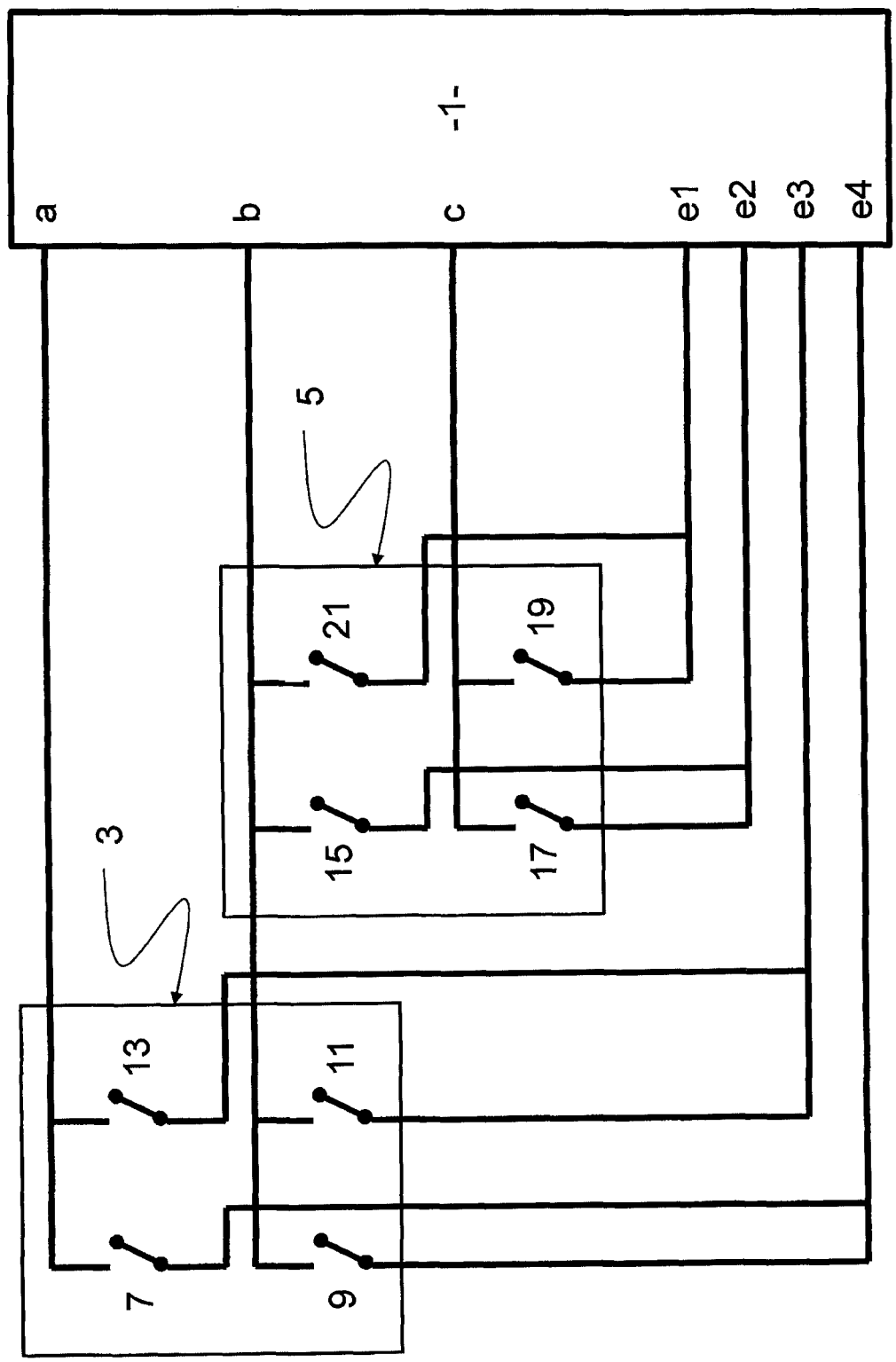
FIG. 1 is a circuit diagram of a device according to the invention.

In FIG. 1, a configuration corresponding to a switching device for the top-end of an automobile vehicle steering column according to the invention is shown schematically.

Said device comprises a microcontroller 1 having several signal outputs a, b, c, and several signal inputs e1, e2, e3, e4. The signal outputs a, b, c and the signal inputs e1, e2, e3, e4 of the microcontroller 1 are connected to at least two separate functional blocks 3, 5.

The signal outputs a, b, c are connections of the microcontroller 1 provided for delivering, over a given period of time, an electrical voltage corresponding to a signal. The inputs e1, e2, e3, e4 are connections of the microcontroller 1 provided for measuring the electrical voltage applied to them and for transmitting the voltage value to the microcontroller 1.

The first switching functional block 3 is connected, on the one hand, to the signal inputs e3, e4 and, on the other hand, to the signal outputs a, b of the microcontroller 1. The second switching functional block 5 is connected, on the one hand, to the signal inputs e1, e2 and, on the other hand, to the signal outputs b, c of the microcontroller 1.

Thus, each switching functional block 3, 5 is connected to two signal inputs e1, e2, e3, e4 and to two signal outputs a, b, c of the micro controller 1. In addition, said separate functional blocks 3 and 5 only share the signal output b, and no signal input e1, e2, e3, e4. Each functional block 3, 5 therefore has one signal output a or c which is connected exclusively to it.

Each functional block comprises four switches; the first block 3 comprises the switches 7, 9, 11, and 13, and the second block comprises the switches 15, 17, 19, 21. Each switch is connected to a signal input e1, e2, e3, e4 and to a signal output a, b, c of the microcontroller 1.

In the first block 3, the switch 7 is connected to the output a and to the input e4, the switch 9 is connected to the output b and to the input e4, the switch 11 is connected to the output b and to the input e3, and the switch 13 is connected to the output a and to the input e3.

In the second block 5, the switch 15 is connected to the output b and to the input e2, the switch 17 is connected to the output c and to the input e2, the switch 19 is connected to the output c and to the input e1, and the switch 21 is connected to the output b and to the input e1.

It is therefore noted that, in each functional block 3 or 5, each of the switches 7, 9, 11, 13, 15, 17, 19 and 21 is connected to a signal input/output pair different from that of the other three of the same block 3 or 5.

The microcontroller 1 is configured for deducing, from a signal sent by at least one signal output a, b, c having transited via at least one switching functional block 3, 5 and received at at least one signal input e1, e2, e3, e4, the switching state of at least one switch of a switching functional block 3, 5.

The signal input/output pairs e1/a and e2/a for the inputs connected to the first functional block 3, to which the signal output is not connected, and e3/c and e4/c for the inputs connected to the second functional block 5, do not correspond to any switch. The microcontroller 1 is thus programmed to detect the arrival of the signal from the output a at the inputs e1 and e2, and the signal from the output c at the inputs e3 and e4, and to interpret them as a sign of a failure. It then sends an identifier of the functional block 3, 5 to which the output a or c is connected whose signal has been received at a signal input e1, e2, e3, e4 to which said input a or c is not connected via a switch 7, 9, 11, 13, 15, 17, 19, 21.

Each switching functional block 3, 5 is associated with a switching module that can take a switching state depending on the control position applied by the user.

The switches 7, 9, 11, 13, 15, 17, 19, 21 associated with a switching module 3, 5 comprise contacting elements, and the control position applied by the user defines a combination of contacts allowing digital information corresponding to a switching state at the input of the microcontroller 1 to be defined.

One of the functional blocks 3, 5 may, for example, control the switching of the lights of the vehicle between the off, side lights, low-beam and high-beam positions, and another controls the fog lights and also a horn of the vehicle.

The microcontroller 1 is configured so as to send trains of periodic signals sequentially over each of its signal outputs a, b, c, in order to determine the switching state of the switching functional blocks 3, 5.

Figure 2:
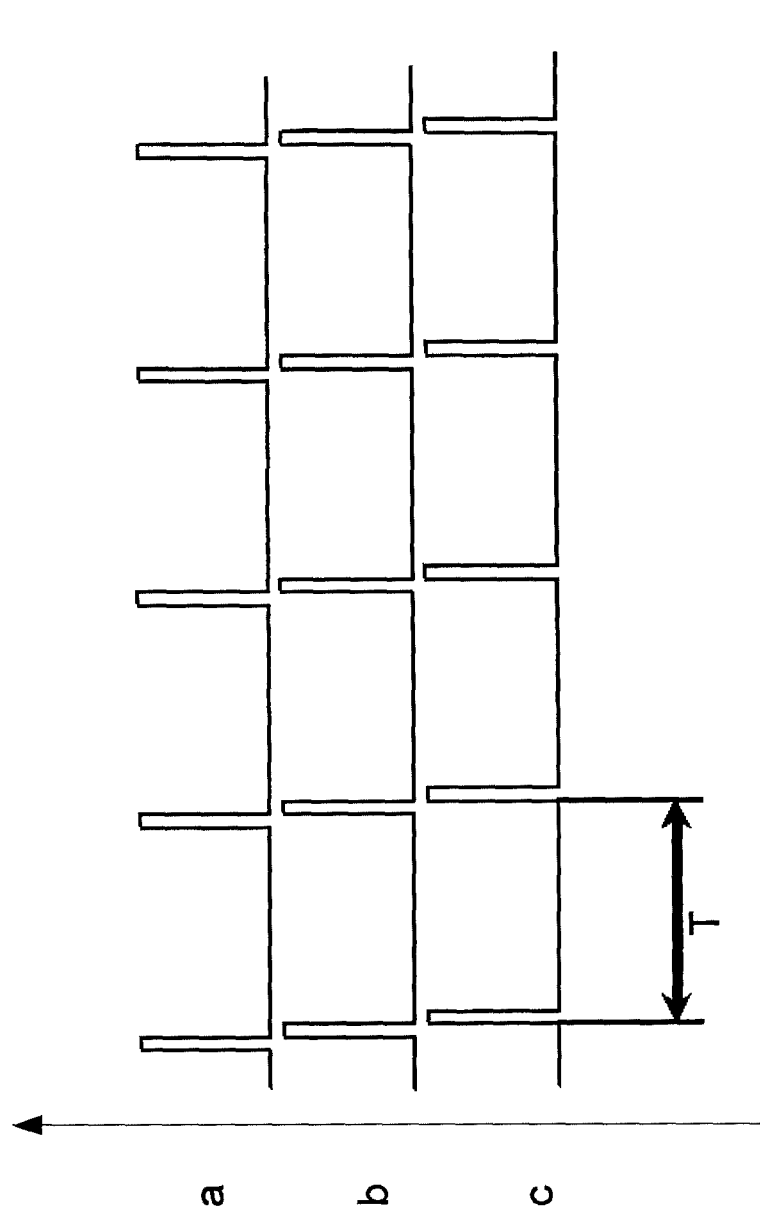
FIG. 2 is a graph of the signals at the signal outputs of the microcontroller in one embodiment of the device with time along the abscissa and voltage delivered along the ordinate.

FIG. 2 is a graph showing the signal emanating from the outputs a, b, c as a function of time in the device of FIG. 1.

On the two signal outputs a, b or b, c connected to the same functional block 3, 5, the periodic signals are out of phase and emitted simultaneously, in order to accelerate the process of determination of the switching state for each functional block.

The signals emanating from each of the signal outputs of the microcontroller 1 are pulse trains in the form of a square-wave, in order for the out of phase signals to have a product that is strictly zero.

In the present embodiment, the pulses of a train are designed to last a few nano- or microseconds, the period T of the trains to a few milliseconds, and the current to which the signals correspond to be a few milliamps.

In operation, the microcontroller 1 sends the signals one after the other over the signal outputs a, b, c associated with the various functional blocks 3, 5. On the two outputs a, b or b, c connected to the same functional block 3, 5, the emission takes place simultaneously with two phase-shifted signals.

These signals arrive at the functional blocks whose switching state corresponds to the position of the control mechanism applied by the user, and defines a combination of contacts with the contacting elements of the switches 7, 9, 11, 13, 15, 17, 19, 21.

The said combination of contacts redirects all or part of said signals toward the signal inputs e1, e2, e3, e4 where they are received and analyzed by the microcontroller 1 in order to adapt the response of the equipment of the vehicle.

Figure 3:
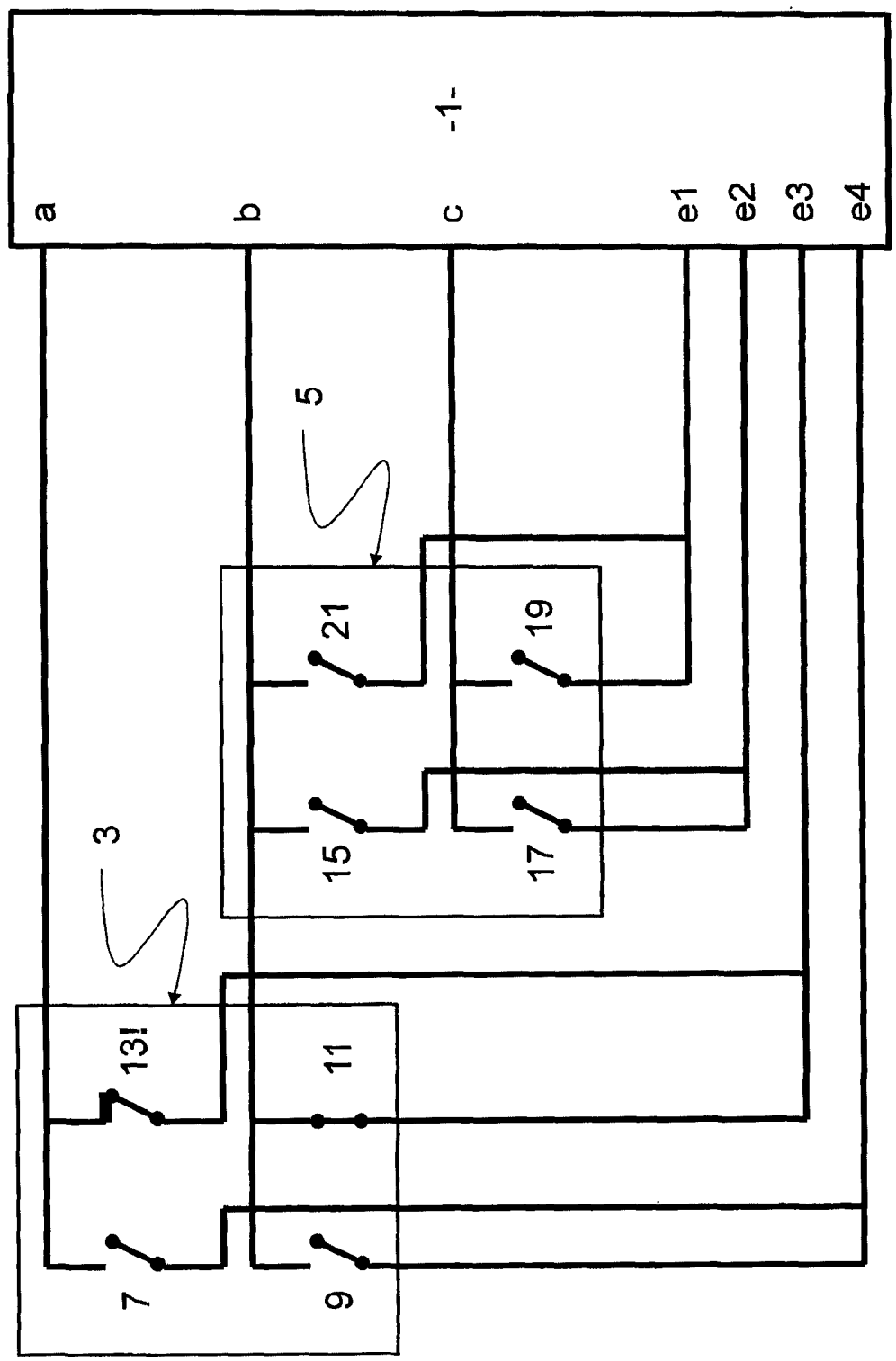
FIG. 3 shows a configuration of the circuit diagram in FIG. 1 where, following a failure, the switch 13 is blocked in a closed position, and where the switch 11 is closed.

FIG. 3 illustrates a case of a possible failure of the switching device in FIG. 1. In this circuit diagram, the case where the switch 13 is blocked in the closed condition is depicted. This scenario can for example result from a mechanical deformation of the electrical contactors of said switch or else subsequent to the accumulation of conductive dusts.

The user then simultaneously closes the switch 11 of the first functional block 3, where the defective switch 13 is located, and one of the switches 15, 17, 19, 21 of the other functional block 5.

FIG. 4 is a table showing the distribution at the signal inputs e1, e2, e3, e4 of the microcontroller 1 of the signals emanating from the signal outputs a, b, c of the microcontroller 1, in the case of the failure in FIG. 3 and as a function of the switch 15, 17, 19, 21 of the non-defective block 5 that the user closes.

In this table, each of the four columns corresponds to one of the signal inputs e1, e2, e3, e4, and the signal that said input receives is also shown as a function of the state of the switch 15, 17, 19, 21 of the second functional block 5 that the user closes. For example, if the user closes the switch 17, which corresponds to the second row, the input e1 does not receive any signal, the input e2 receives the signal emanating from the output c, the input e3 receives the sum of the signals emanating from the output a and from the output b, and the input 4 does not receive any signal.

In particular, when the user closes the switch 15, the signal input e2 receives the signals from the signal outputs a and b. When the switch 21 is closed, the signal input e1 receives the signals from the signal outputs a and b.

The signal input/output pairs e2/a and e1/a do not correspond to any of the switches of the configuration. Accordingly, for the interpretation of the switching states of the functional blocks 3, 5, the signal emanating from the signal output a and received at one of the two signal inputs e1, e2, is not taken into account and does not lead to an erroneous interpretation of said switching states.

In the case of a failure of one of the switches 7, 9, 11, 13, 15, 17, 19, 21 of a functional block 3, 5, the response of the systems equipping the vehicle is erroneous only for the equipment associated with the function that the functional block 3 containing the defective switch 13 controls.

Moreover, the microcontroller 1 detects the signal sent by a signal output a, c only connected to a switching functional block 3, 5, at a signal input 20 e1, e2, e3, e4 which is not connected to said switching functional block 3, 5. It sends a message comprising an identifier of the block 3, 5 to which the signal output a, c is connected in which the defective switch is located.

In this way, the user is informed by this message that one of the switches 7, 9, 11, 13, 15, 17, 19, 21 is defective, and similarly informed of the identity of the switching functional block 3 in which the defective switch 13 is located. In the case of a failure, the user can therefore take care of replacing the defective switching functional block 3 in a timely and targeted manner.

The invention therefore provides an improvement in terms of safety by isolating the errors to the function whose functional block 3, 5 comprises a defective switch, and performs a diagnostic function by informing the user both of the presence and of the position of a contacting error in the functional blocks 3, 5.

Figure 5:
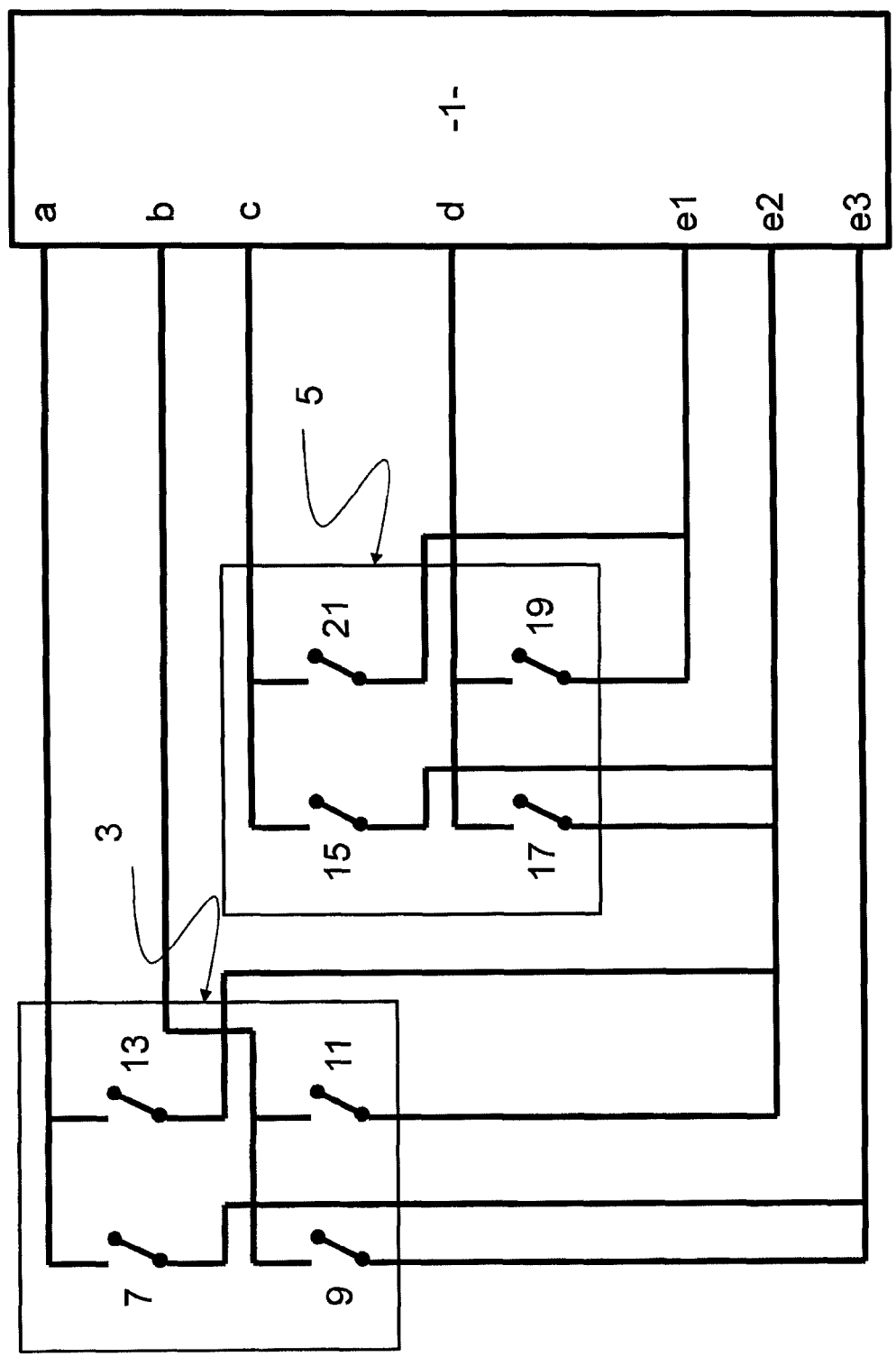
FIG. 5 is a circuit diagram of one alternative embodiment of a device according to the invention.

An equivalent alternative embodiment is shown in FIG. 5. Here, the microcontroller 1 comprises three signal inputs e1, e2, e3, and four signal outputs a, b, c, d. The functional blocks 3, 5 thus share a single signal input e2 and no signal output a, b, c, d, and each functional block 3, 5 has a signal input e1, e3 connected exclusively to it.

Its operation is analogous to the embodiment described hereinabove. Out of the twelve signal input/output pairs available, eight are used to define, via one of the switches 7, 9, 11, 13, 15, 17, 19, 21, a switching state associated with a function of one of the functional blocks 3, 5, and four are used for the diagnostic function.

For this purpose, the detection of the signal emanating from one of the outputs a, b on the signal input e3, and the detection of the signal emanating from one of the outputs c, d on the signal input e1 triggers the emission of a signal comprising an identifier of the block 3, 5 to which the signal input e1 or e3 is connected in which the defective switch is located.

The invention claimed is:

1. A switching device for a top-end of an automobile vehicle column comprising:
   a microcontroller;
   at least two separate switching functional blocks, each block being directly connected to two signal inputs and two signal outputs of the microcontroller, one signal output or one signal input is only directly connected to a single functional block, wherein each switching functional block contains four switches; and
   each switch being directly connected to a signal input/output pair of the microcontroller separate from the signal input/output pair of the microcontroller for the other three switches of the same block,
   wherein the at least two separate switching functional blocks only share either the one signal output or the one signal input of the microcontroller,
   wherein the microcontroller deduces, from a signal sent by at least one signal output having transited via at least one switching functional block and received at least one signal input, a switching state of at least one switch of the switching functional block, and
   wherein the microcontroller detects the signal sent by the at least one signal output that is only connected to one of the at least two switching functional blocks, at the at least one signal input that is not connected to the other one of the at least two switching functional blocks, and sends a message comprising an identifier for the block to which the at least one signal output is connected.

2. The switching device as claimed in claim 1, wherein each switching functional block is associated with a switching module that takes a switching state according to the control position applied by a user.

3. The switching device as claimed in claim 2, wherein the switches associated with a switching module comprise contacting elements and the control position applied by the user defines a combination of contacts allowing digital information corresponding to a switching state to be defined at a signal input of the microcontroller.

4. The switching device as claimed in claim 3, wherein one switching functional block controls the switching of lights of the vehicle between an off position, a side-beam position, a low-beam position, and a high-beam position and another switching functional block controls fog lights and a horn of the vehicle.

5. The switching device according to claim 1, wherein the microcontroller is configured for determining the switching state of the switching functional blocks by sending trains of periodic signals sequentially over each of the signal outputs.

6. The switching device as claimed in claim 5, wherein the signals emitted over each of the two signal outputs of the microcontroller connected to the same block are out of phase and emitted simultaneously.

7. The switching device as claimed claim 5, wherein the signals emanating from the two signal outputs of the microcontroller are pulse trains in the form of a square-wave.

8. The switching device as claimed in claim 7, wherein pulses of the pulse trains last a few nano- or microseconds, and a period of the pulse trains is a few milliseconds.

9. The switching device as claimed in claim 5, wherein the signals emanating from the two signal outputs of the microcontroller correspond to a current of a few milliamps.

10. A control assembly for the top-end of an automobile vehicle steering column comprising a switching device according to claim 1.

\* \* \* \* \*